United States Patent Office 3,519,601
Patented July 7, 1970

3,519,601
SILOXAMINE COMPOUNDS
Charles E. Creamer, Ridgefield, Conn., assignor to Union
Carbide Corporation, a corporation of New York
No Drawing. Filed July 26, 1968, Ser. No. 747,823
Int. Cl. C08f 11/04
U.S. Cl. 260—46.5    8 Claims

ABSTRACT OF THE DISCLOSURE

Linear siloxamine polymers containing at least three pendent [R'(Y)SiO] aminosiloxy units wherein R' is hydrogen, phenyl, lower alkyl or a Y radical and Y is an amino radical of the formula —NX$_1$X$_2$ where X$_1$ is hydrogen or lower alkyl and Y$_2$ is phenyl or lower alkyl; said siloxamines being especially useful as cross-linking agents in room temperature vulcanizable siloxane compositions.

SUMMARY OF THE INVENTION

This invention relates to novel siloxamine polymers. More specifically this invention relates to linear siloxamine polymers containing at least three pendent amino siloxy units.

The linear siloxamine polymers encompassed by this invention are those having the general formula:

$$R_3SiO\left[\begin{matrix}R^1\\|\\Si O\\|\\Y\end{matrix}\right]_n\left[\begin{matrix}R^2\\|\\Si O\\|\\R^2\end{matrix}\right]_m SiR_3$$

wherein Y represents an amino radical —NX$_1$X$_2$, wherein X$_1$ represents a radical selected from the group consisting of hydrogen and lower alkyl radicals, wherein X$_2$ represents a radical selected from the group consisting of phenyl and lower alkyl radicals and wherein N, X$_1$ and X$_2$ taken together form a heterocyclic radical such as piperidine and morpholine; wherein R represents a member selected from the group consisting of lower alkyl and a Y radical as defined above; wherein R$^1$ represents a radical selected from the group consisting of hydrogen, phenyl, lower alkyl and a Y radical as defined above; wherein R$^2$ represents a radical selected from the group consisting of hydrogen, phenyl and lower alkyl radicals; wherein $n$ is an integer ranging from at least 3 to 5000 and wherein $m$ has a value of from 0 to 20,000.

The term lower alkyl as used herein refers to alkyl radicals having from 1 to 6 carbon atoms such as methyl, ethyl, propryl, butyl, t-butyl, pentyl and hexyl radicals and the like, the preferred raricals being methyl and ethyl.

Of course it is understood that the siloxamine compounds of this invention may be homopolymers, copolymer or terpolymers and that the above defined radicals, R, R$^1$, R$^2$, Y, X$_1$ and X$_2$ may be the same or different in any given siloxy unit. Moreover the pendent, that is internal, siloxy units may be present in any random fashion and are not intended to be restricted to any particular numerical order.

DESCRIPTION OF THE PREFERRED EMBODIMENTS

More particularly, illustrative siloxamine polymers of this invention are those which contain at least three internal [R'SiYO] amino siloxy units, such as H(MeHN)SiO
Et(MeHN)SiO, Et(EtHN)SiO, φ(MeHN)SiO
Et(MeHN)SiO, Et(EtHN)SiO, φ(MeHN)SiO
H(Me$_2$N)SiO, Me(Me$_2$N)SiO, Et(Me$_2$N)SiO
φ(Et$_2$N)SiO, Me(MeEtN)SiO, C$_3$H$_7$(Me$_2$N)SiO
Me((C$_3$H$_7$)$_2$N)SiO, Me(C$_5$H$_{10}$N)SiO

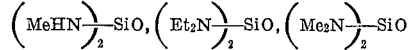

Me(φHN)SiO and the like; and which contain [R$_3$SiO] end-blocking siloxy units, such as Me$_3$SiO, Et$_3$SiO, Me$_2$EtSiO, MeEt$_2$SiO, Me$_2$[Me$_2$N]SiO and the like and which also contain one or more [(R$_2$)$_2$SiO] internal siloxy units, such as H$_2$SiO, HMeSiO, HEtSiO, Me$_2$SiO, Et$_2$SiO, (C$_3$H$_7$)$_2$SiO, MeEtSiO, φ$_2$SiO, MeφSiO and the like. In the above units and throughout the rest of this specificaation Me represents a methyl radical (CH$_3$—); Et represents an ethyl radical (C$_2$H$_5$—) and φ represents a phenyl radical (C$_6$H$_5$—).

Among the most preferred siloxamine polymers of this invention are those copolymers having the general formula

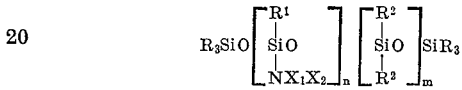

wherein R, R$^1$, X$_1$ and X$_2$ are lower alkyl radicals; wherein R$_2$ is a radical selected from the group consisting of hydrogen, phenyl and lower alkyl radicals, wherein $n$ is an integer of from 3 to 100 and wherein $m$ is an integer of from 12 to 500.

The siloxamines of this invention are preferably prepared by reacting a linear hydrosilicon modified silicone polymer containing at least three pendent hydrosiloxy groups

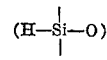

with an organic primary or secondary amine in the presence of a platinum catalyst. The reaction is preferably conducted under anhydrous conditions and under autogenous pressure at temperatures ranging from about room temperature up to about 275° C. This reaction involves the replacement of the desired amount or number of hydrogen bonded silicon atoms (SiH) from the hydrosiloxane starting polymer with the amino radical derivative along with the liberation of hydrogen gas and is essentially a stoichiometric reaction, although a slight excess of amine is normally used. Thus the general reaction is as follows:

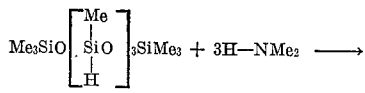

Said reaction may be found more fully described in the concurrently filed U.S. application No. 747,833 filed July 26, 1968, of R. C. Borchert, entitled "Process for Preparing Organosilicon-Nitrogen Compounds," the teachings of which application are incorporated herein by reference thereto.

Illustrative linear hydrosiloxane starting materials that may be employed in said process are those which contain at least three pendent siloxy units, such as, H$_2$SiO, MeHSiO, EtHSiO, φHSiO, C$_3$H$_7$(H)SiO and the like, along with end-blocking siloxy units e.g. Me$_3$SiO, Et$_3$SiO and the like.

Such hydrosiloxanes as well as their methods of preparation are well known in the art and can be represented by the general formula

wherein R represents a hydrogen atom or a lower alkyl radical and wherein $R^1$ and $R^2$ represent a hydrogen atom, a phenyl radical or a lower alkyl radical.

Illustrative organic primary and secondary amines that may be employed as reactants in the process of manufacture are those having the formula

wherein $X_1$ represents a member selected from the group consisting of a hydrogen atom and a lower alkyl radical having from 1 to 6 carbon atoms; wherein $X_2$ represents a phenyl or lower alkyl radical having from 1 to 6 carbon atoms and wherein N, $X_1$ and $X_2$ taken together may form a heterocyclic ring such as piperidine or morpholine. Illustrative specific examples of such amines are methylamine, ethylamine, propylamine, isopropylamine, butylamine, t-butylamine, hexylamine, phenylamine, dimethylamine, diethylamine, diisopropylamine, methylethylamine, methylpropylamine, ethylphenylamine and the like.

Any conventional platinum catalyst may be employed, such as the metal platinum, supported and unsupported platinum, platinum compounds and platinum complexes. Obviously while only a catalytic amount of platinum catalyst need be employed in the process, preferred amounts range from about 20 to about 500 parts by weight per million parts by weight based on the weight of the total reactants.

Alternatively the linear siloxamine polymers of this invention may be prepared by the conventional process of reacting a chloro substituted siloxane polymer (Si—Cl) with two moles of primary or secondary amine as illustrated by the following skeletal equation $$\equiv Si-Cl + 2 \equiv NH \rightarrow \equiv Si-N + \equiv N \cdot HCl$$

However this process is generally preferred only for preparing siloxamine polymers having a small amino radical content due to the difficulty of preparing chloro substituted siloxane starting materials having a high chlorine content and due to the bulky precipitated base chloride salt by-product that accompanies this process, although said process may be effectively modified by the improved method described in my copending U.S. application, Ser. No. 672,445, filed Oct. 3, 1967, now Pat. No. 3,467,686.

The siloxamine polymers of this invention can be used to impart water-repellency to materials such as paper, leather and cellulosic fabrics, as processing aids for polysiloxane elastomers and in the treatment of elastomer fillers. Said siloxamines are also especially useful as the trifunctional cross-linking agents in room temperature curable compositions to produce such products as silicone gum and silicone elastomers. Such types of RTV compositions are disclosed for example in U.S. Pat. 3,065,194 patented Nov. 20, 1962, and in my copending U.S. application Ser. No. 529,665 filed Feb. 24, 1966, now Pat. No. 3,451,964.

The following examples are illustrative of the present invention and not to be regarded as limitative. It is to be understood that all parts, percentages and proportions referred to herein and in the appended claims are by weight unless otherwise indicated. In said examples Me represents a methyl radical, Et represents an ethyl radical and $\phi$ represents a phenyl radical.

EXAMPLE 1

One hundred grams of a hydrosilicon modified siloxane polymer having the average formula $$Me_3SiO[MeSiHO]_{4.5}[Me_2SiO]_{12}SiMe_3$$

were charged into a 300 cc. stainless steel pressure vessel. Said polymer was prepared by equilibrating $Me_3SiOSiMe_3$, $[MeHSiO]_5$ and $[Me_2SiO]_4$ and contained 0.335 mole of MeSiHO hydrosiloxy units and had a cryoscopic molecular weight of $1370 \pm 137$. About 0.35 mole (15.8 grams) of anhydrous dimethylamine were charged into the vessel followed by 200 parts by weight per million parts by weight of platinum as a one percent $H_2PtCl_6 \cdot 6H_2O$ catalyst solution in tetrahydrofuran. The vessel was heated to 200° C. and this temperature maintained for 2 hours. The reaction mixture was then cooled to room temperature and vacuum stripped to yield 102 grams of siloxamine product having the average formula $$Me_3SiO[Me(NMe_2)SiO]_{4.5}[Me_2SiO]_{12}SiMe_3$$

Infrared analysis showed the presence of no silicon bonded hydrogen and titration analysis showed the presence of $13.9 \pm 1\%$ of silicon bonded dimethylamine (13.1% theoretical).

Following the above procedure a number of reactions were conducted on various hydrosilicon modified polymers to produce the corresponding siloxamine products having the average formula:

$$Me_3SiO[MeSiNMe_2O]_{4.5}[Me_2SiO]_{24}SiMe_3$$
$$Me_3SiO[MeSiNMe_2O]_{4.5}[Me_2SiO]_{48}SiMe_3$$
$$Me_3SiO[MeSiNMe_2O]_9[Me_2SiO]_{12}SiMe_3$$
$$Me_3SiO[MeSiNMe_2O]_9[Me_2SiO]_{24}SiMe_3$$
$$Me_3SiO[MeSiNMe_2O]_9[Me_2SiO]_{48}SiMe_3$$
$$Me_3SiO[MeSiNMe_2O]_{18}[Me_2SiO]_{12}SiMe_3$$
$$Me_3SiO[MeSiNMeO]_{18}[Me_2SiO]_{24}SiMe_3$$
$$Me_3SiO[MeSiNMeO]_{18}[Me_2SiO]_{48}SiMe_3$$

EXAMPLE 2

One hundred grams of a hydrosiloxane polymer having the average formula $$Me_3SiO[MeHSiO]_{4.5}[Me_2SiO]_{12}SiMe_3$$

were charged into a 300 cc. stainless steel pressure vessel. About 0.35 mole (32.6 grams) of anhydrous $\phi NH_2$ were charged into the vessel followed by 100 parts by weight per million parts by weight (0.013 gram) of platinum as a one percent $H_2PtCl_6 \cdot 6H_2O$ catalyst solution in tetrahydrofuran and the vessel heated to 200° C. for three hours. After cooling to room temperature the reaction mixture was vacuum stripped to yield 108 grams of siloxamine product having the average formula $$Me_3SiO[(Me)(\phi NH)SiO]_{4.5}[Me_2SiO]_{12}SiMe_3$$

Infrared analysis showed the presence of no silicon bonded hydrogen and titration analysis showed the presence of $23.9\% \pm 1$ of silicon bonded dimethylamine (23.9% theoretical). The product had a cryoscopic molecular weight of $1750 \pm 175$.

EXAMPLE 3

Fifty grams of a hydrosiloxane polymer having the average formula $$Me_3SiO[MeHSiO]_{60}[MeEtSiO]_{1521}SiMe_3$$

containing 0.002 mole of MeSiHO hydrosiloxy units were charged into a 300 cc. stainless steel pressure vessel. About 0.03 mole (2.19 grams) of anhydrous diethylamine were charged into the vessel followed by 1 gram of a 5 percent platinum on $Al_2O_3$ support catalyst. The vessel was heated to 175° C. for four hours. After cooling to room temperature the reaction mixture was vacuum stripped to yield 46 grams of siloxamine product having the average formula $$Me_3SiO[Me(Et_2N)SiO]_{60}[MeEtSiO]_{1521}SiMe_3$$

Infrared analysis showed the presence of no silicon bonded hydrogen and titration analysis showed the presence of 3.4% of silicon bonded diethylamine (3.39% theoretical). The product had a vapor osmometer molecular weight of $137,500 \pm 1375$.

EXAMPLE 4

One hundred grams of a hydrosiloxane polymer having the average formula

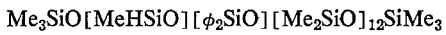
$Me_3SiO[MeHSiO][\phi_2SiO][Me_2SiO]_{12}SiMe_3$ containing 0.33 mole of MeHSiO hydrosiloxy units were charged into a 300 cc. stainless steel pressure vessel. About 15 cc. of anhydrous dimethylamine were charged into the vessel followed by 0.5 gram of platinum as a 1 percent $H_2PtCl_6 \cdot 6H_2O$ catalyst solution in tetrahydrofuran and the vessel heated to 175° C. for three hours. After cooling to room temperature the reaction mixture was vacuum stripped to yield about 104 grams of siloxamine product having the average formula

$Me_3SiO[Me(NMe_2)SiO]_6[\phi_2SiO]_2[Me_2SiO]_{12}SiMe_3$

Infrared analysis showed the presence of no silicon bonded hydrogen, titration analysis showed the presence of 12.7% ±0.1 of silicon bonded dimethylamine (12.75% theoretical) and ultraviolet analysis showed the presence of 14.1% ±1 of silicon bonded phenyl (14.9% theoretical). The product had a cryoscopic molecular weight of 1994±199.

EXAMPLE 5

One hundred grams of a hydrosiloxane polymer having the average formula

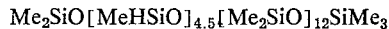
$Me_3SiO[MeHSiO]_{4.5}[Me_2SiO]_{12}SiMe_3$ were charged into a 300 cc. stainless steel pressure vessel. About 0.266 mole (12 grams) of anhydrous dimethylamine were charged into the vessel followed by 200 parts by weight per million parts by weight of platinum as a one percent $H_2PtCl_6 \cdot 6H_2O$ catalyst solution in tetrahydrofuran and the vessel heated to 200° C. for two hours. After cooling to room temperature the reaction mixture was sparged with anhydrous nitrogen at 100° C. and yielded 105 grams of siloxamine product having the average formula

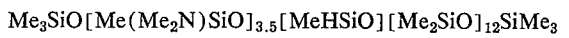
$Me_3SiO[Me(Me_2N)SiO]_{3.5}[MeHSiO][Me_2SiO]_{12}SiMe_3$

Infrared analysis showed the presence of silicon bonded hydrogen (0.6×10⁻³ moles per gram of fluid) and titration analysis showed the presence of 10.4±.1% silicon bonded dimethylamine (10.5% theoretical). The product had a cryoscopic molecular weight of 1460±146.

EXAMPLE 6

One hundred grams of a dimethylsiloxane end-blocked with dimethylamine having the average formula

$(Me_2N)(Me_2)SiO[Me_2SiO]_xSi(Me_2)(NMe_2)$ and a viscosity of 280 centistokes at 25° C. were charged into a one quart vertical dual blade mixer. While mixing under anhydrous conditions 42 grams of ground quartz and 18 grams of diatomaceous earth were added. After mixing to a uniform blend, 7.6 grams of the siloxamide polymer product of Example 1 having the average formula

$Me_3SiO[Me(Me_2N)SiO]_{4.5}[Me_2SiO]_{12}SiMe_3$ were added followed by 0.05 gram of alpha-chloropropionic acid. The liquid mixture was then cast into 8 inch by eight inch by one-eighth inch Teflon lined molds and exposed to atmospheric moisture. After 5 days of exposure the samples had cured into useful siloxane elastomers having the following physical properties.

| | |
|---|---|
| Hardness, Shore A | 32 |
| Tensile, p.s.i. | 290 |
| Elongation, percent | 260 |

Various modifications and variations of this invention will be obvious to a worker skilled in the art and it is to be understood that such modifications and variations are to be included within the purview of this application and the spirit and scope of the appended claims.

What is claimed is:

1. A linear siloxamine polymer having the general formula

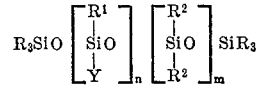

$$R_3SiO\left[\begin{array}{c}R^1\\|\\SiO\\|\\Y\end{array}\right]_n\left[\begin{array}{c}R^2\\|\\SiO\\|\\R^2\end{array}\right]_m SiR_3$$

wherein Y is an amino radical of the formula $-NX_1X_2$ wherein $X_1$ is a member selected from the group consisting of hydrogen and lower alkyl radicals, wherein $X_2$ is a member selected from the group consisting of phenyl and lower alkayl radicals, wherein R represents a member selected from the group consisting of lower alkyl and Y as defined above; wherein $R^1$ represents a radical selected from the group consisting of hydrogen, phenyl, lower alkyl and Y as defined above; wherein $R^2$ represents a member selected from the group consisting of hydrogen, phenyl and lower alkyl radicals; wherein $n$ is an integer ranging from at least 3 to 5000 and wherein $m$ has a value of from 0 to 20,000.

2. A linear siloxamine polymer as defined in claim 1; wherein $n$ is from 3 to 100 and $m$ is from 12 to 500.

3. A linear siloxamine polymer as defined in claim 1, wherein R, $R^1$ and $R^2$ are lower alkyl radicals.

4. A linear siloxamine polymer as defined in claim 1, wherein $X_1$ and $X_2$ are lower alkyl radicals.

5. A linear siloxamine polymer as defined in claim 1, wherein R, $R^1$, $R^2$, $X_1$ and $X_2$ are methyl radicals.

6. A linear siloxamine polymer as defined in claim 1, wherein R, $R^1$ and $R^2$ are lower alkyl radicals.

7. A linear siloxamine polymer as defined in claim 2, wherein $X_1$ and $X_2$ are lower alkyl radicals.

8. A linear siloxamine polymer as defined in claim 2, wherein R, $R^1$, $R^2$, $X_1$ and $X_2$ are methyl radicals.

References Cited

UNITED STATES PATENTS

| | | | |
|---|---|---|---|
| 3,451,964 | 6/1969 | Creamer | 260—37 |
| 3,467,686 | 9/1969 | Creamer | 260—448.2 |

DONALD E. CZAJA, Primary Examiner

M. I. MARQUIS, Assistant Examiner

U.S. Cl. X.R.

117—142, 143, 154; 260— 37, 448.2

PO-1050
(5/69)

UNITED STATES PATENT OFFICE
CERTIFICATE OF CORRECTION

Patent No. 3,519,601 .                    Dated July 7, 1970

Inventor(s) Charles E. Creamer

It is certified that error appears in the above-identified patent and that said Letters Patent are hereby corrected as shown below:

In line 5 of the ABSTRACT cancel the symbol "$Y_2$" and insert-- $X_2$ --. Column 1, line 51 cancel the term "propryl" and insert-- propyl --. Column 1, line 68 add the following siloxy units-- $H(EtHN)SiO$, $Me(MeHN)SiO$, $Me(EtHN)SiO$, --. Column 1, line 70 cancel the siloxy unit "$Et(MeHN)SiO$" for it is a double inclusion and appears as the first siloxy unit in column 1, line 69. Column 2, line 8 cancel the formula " $[(R_2)_2SiO]$ " and insert-- $[(R^2)_2SiO]$ --. Column 2, line 12, correct the spelling of the term "specification". Column 4, line 28, that portion of the formula reading " $[MeSiNMeO]$ " should read-- $[MeSiNMe_2O]$ --. Column 4, line 29 that portion of the formula reading " $[MeSiNMeO]$ " should read-- $[MeSiNMe_2O]$ --.

SIGNED AND
SEALED

OCT 27 1970

(SEAL)
Attest:

Edward M. Fletcher, Jr.
Attesting Officer

WILLIAM E. SCHUYLER, JR.
Commissioner of Patents